US010626920B1

(12) United States Patent
Román Negrón

(10) Patent No.: US 10,626,920 B1
(45) Date of Patent: Apr. 21, 2020

(54) ANGULAR CONTACT AND PURELY AXIAL BEARINGS WITH ANTI-FRICTION SEPARATORS

(71) Applicant: Alberto José Román Negrón, Orlando, FL (US)

(72) Inventor: Alberto José Román Negrón, Orlando, FL (US)

(*) Notice: Subject to any disclaimer, the term of this patent is extended or adjusted under 35 U.S.C. 154(b) by 0 days.

(21) Appl. No.: 16/200,534

(22) Filed: Nov. 26, 2018

(51) Int. Cl.
| F16C 19/10 | (2006.01) |
| F16C 33/58 | (2006.01) |
| F16C 33/37 | (2006.01) |
| F16C 33/372 | (2006.01) |
| F16C 33/66 | (2006.01) |
| F16C 33/60 | (2006.01) |

(52) U.S. Cl.
CPC .......... *F16C 33/3706* (2013.01); *F16C 19/10* (2013.01); *F16C 33/372* (2013.01); *F16C 33/3713* (2013.01); *F16C 33/585* (2013.01); *F16C 33/605* (2013.01); *F16C 33/66* (2013.01)

(58) Field of Classification Search
CPC ........ F16C 19/08; F16C 19/10; F16C 19/181; F16C 19/30; F16C 19/38; F16C 33/366; F16C 33/3713; F16C 33/372; F16C 33/605; F16C 33/3706
USPC ........ 384/445, 504, 522, 551, 553, 565, 568
See application file for complete search history.

(56) References Cited

U.S. PATENT DOCUMENTS

| 951,847 | A | * | 3/1910 | Seubert | F16C 19/20 384/522 |
| 1,287,225 | A | * | 12/1918 | Cheney | F16C 19/20 384/522 |
| 1,487,185 | A | * | 3/1924 | Seifarth | F16C 19/38 384/571 |
| 1,494,638 | A | * | 5/1924 | Sheldon | F16C 19/26 384/553 |
| 1,507,586 | A | * | 9/1924 | Cooper | F16C 43/06 384/513 |
| 2,431,810 | A | * | 12/1947 | Knaak | F16C 19/40 384/551 |
| 3,124,396 | A | * | 3/1964 | Barager | F16C 19/20 384/522 |
| 3,455,616 | A | * | 7/1969 | George | F16C 19/20 384/520 |
| 3,790,239 | A | * | 2/1974 | Laux | F16C 19/20 384/463 |

(Continued)

FOREIGN PATENT DOCUMENTS

| DE | 4236847 A1 * | 5/1994 | ............. F16C 19/40 |
| DE | 102017217810 A1 * | 4/2019 | ............ F16C 19/463 |

(Continued)

*Primary Examiner* — Marcus Charles
(74) *Attorney, Agent, or Firm* — Franco S. De Liguori; DP IP Group

(57) ABSTRACT

An anti-friction bearing includes a pair of rotatable tracks, a pair of extension members removably securely mounted to one of the pair of tracks, spaced load-carrying rolling members rotatably engageable between the two tracks, and individual spacers disposed to roll on the surfaces of the pair of extensions members. Each of the individual spacers is engageable with and cooperatively separates an adjacent pair of the rolling elements. All of the components of the bearing are disposed in corresponding pure rolling contact, i.e., without sliding, relative one another.

20 Claims, 12 Drawing Sheets

(56) References Cited

U.S. PATENT DOCUMENTS

| | | | | | |
|---|---|---|---|---|---|
| 3,843,217 | A | * | 10/1974 | Henning | F16C 19/40 384/447 |
| 4,795,279 | A | * | 1/1989 | Smith | F16C 19/20 384/450 |
| 4,799,809 | A | * | 1/1989 | Kuroiwa | F16C 19/20 384/475 |
| 4,859,090 | A | * | 8/1989 | Smith | F16C 19/16 384/463 |
| 5,123,756 | A | * | 6/1992 | Amen | F16C 19/36 384/551 |
| 8,523,451 | B2 | * | 9/2013 | Ozu | F16C 19/26 384/551 |
| 9,885,385 | B2 | * | 2/2018 | Kullin | F16C 19/40 |
| 2016/0069389 | A1 | * | 3/2016 | Bell | F16C 33/3706 384/573 |

FOREIGN PATENT DOCUMENTS

| | | | | | |
|---|---|---|---|---|---|
| JP | 2007092983 | A | * | 4/2007 | F16C 33/3706 |
| JP | 2007255601 | A | * | 10/2007 | F16C 19/28 |
| JP | 4253069 | B2 | * | 4/2009 | F16C 19/38 |

* cited by examiner

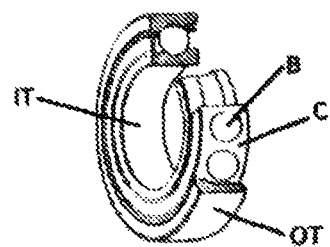
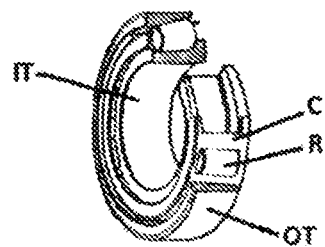
Fig. 1 (a) Prior Art
Fig. 1 (b) Prior Art
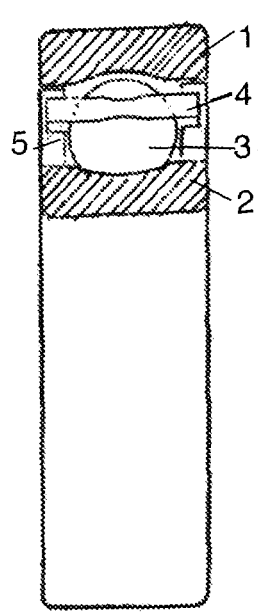
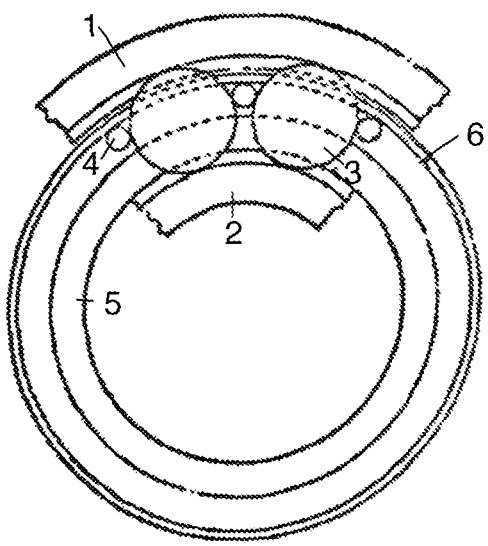
Fig. 2 (a) Prior Art
Fig. 2 (b) Prior Art

ANGULAR CONTACT AND PURELY AXIAL BEARINGS WITH ANTI-FRICTION SEPARATORS

BACKGROUND OF THE DISCLOSURE

Field of the Disclosure

The present disclosure relates generally to anti-friction bearings and, more specifically, to angular contact and purely axial bearings with anti-friction spacers or separators such that all bearing components move with pure rolling contact, i.e., without sliding contact among the bearing integral parts.

Background Information

Conventional angular contact and purely axial bearings are generally formed of two rings or tracks, a predetermined number of rolling elements (e.g., balls or rollers) placed between these tracks, and a single retainer or cage which maintains the rolling elements around the periphery of the tracks equidistantly separated, thus avoiding the high degree of friction that would be generated if those elements would touch each other. The difference between these two types of bearings is that while angular contact bearings can bear radial and axial loads at the same time, the latter in one direction only, purely axial bearings can only support an axial load in one direction.

In angular contact bearings, the line of action of the force applied to the bearing is in a contact angle α with the axis of symmetry of the bearing. This means that these types of bearings are designed to accommodate combined loads, i.e., simultaneously acting radial and axial loads. When the contact angle α is equal to zero, only an axial load acts. In that case, the bearing becomes a purely axial bearing. Accordingly, a purely axial bearing is a particular case of an angular contact bearing when the contact angle α is equal to zero. For this reason, in the present disclosure the term "angular contact bearing" includes purely axial bearings.

FIGS. 1(a)-1(b) show conventional angular contact bearings of the ball (FIG. 1(a)) and roller (FIG. 1(b)) type. The conventional angular contact bearings include an inner track IT, an outer track OT, balls or rollers B or R, and a cage C. In both of these types of conventional bearings, the contact among the rolling elements B or R and cages C occurs with a high degree of sliding, resulting in friction and wear. As a result, the cage breaks more frequently than the other components of the bearing. When the cage breaks, the bearing is blocked. In some cases, the breaking of the cages is due to fatigue or by high pressure exerted on them by the rolling elements due to centrifugal forces whose magnitudes are directly proportional to the angular velocity of the bearing. Sometimes, to obtain a better support, the cages additionally contact a track with a high level of sliding which provides an additional source of friction and wear. The friction and wear usually determine the lower limit of the length of service of the bearings and, at the same time, shortens the fatigue functioning time.

The foregoing inconvenience inspired the idea of using another type of spacers or separators to eliminate the sliding contact among the rolling elements and the conventional cage. There is known a solution to the problem stated before, but only for bearings of the radial type, which are bearings that can bear loads in the radial direction only. FIGS. 2(a)-2(b) show an example of a ball bearing of this type disclosed in British Patent No 122,178 to Ivan August Mauritz Larsson ("Larsson"). The ball bearing disclosed by Larsson is formed of an outer ring 1, inner ring 2, rolling elements (balls) 3 and individual separators 4 guided by means of annular bearing surfaces 6 on plates 5 which are fixed upon the inner ring 2 or removably connected therewith. In the Larsson ball bearing, rolling elements 3 and separators 4 have a motion in the plane compounded by a spin around its axis of symmetry and a precession around the center of the bearing, similar to mod on of the planets around the sun. For this reason, separators 4 have the shape of two cylinders with the same axis of symmetry.

When the bearing is of the angular contact type, the rolling elements and the individual separators have a mod on in the space known as "rolling cone" where they rotate around a fixed point. Because of this, the separators must have the shape of two truncated cones with common vertices and axes of symmetry. Its synthesis is much more complex than those for radial bearings. This means that the cylindrical separators for purely radial bearings cannot be used for angular contact bearings and vice versa because the kind of motion that they perform are very different.

In view of the foregoing, there is a need for angular contact bearings with anti-friction separators which overcome the foregoing drawbacks of the conventional art.

SUMMARY OF THE DISCLOSURE

It is an object of the present disclosure to provide angular contact bearings with anti-friction separators such that all bearing parts move with pure rolling, contact, i.e., without sliding contact among the bearing components.

Another object of the present disclosure is to provide anti-friction separators which substantially improve the performance of angular contact bearings and reduce the chances of failure. This is achieved by angular contact bearings equipped with the anti-friction separators of the present disclosure which effectively eliminate friction and wear caused by conventional cages, obtain greater wear and fatigue functioning times, increase the operating speed ranges, boost the time and speed of operation, and increase capacities of static and dynamic load by occupying less space which makes it possible to arrange a larger number of rolling elements in the angular contact bearings and, therefore, raise the load capacities of the bearings.

Another object of the present disclosure is to provide angular contact bearings with anti-friction separators, which are economical and easy to manufacture and assemble.

A feature of the present disclosure relates to the replacement of the separating cage in conventional angular contact bearings with the individual separators according, to the present disclosure. Each of the separators is placed between two contiguous rolling elements (e.g., balls or rollers) that it separates and in contact with two extensions of anyone of two tracks. By this arrangement, pure rolling contact among all of the bearing components is ensured.

According to the present disclosure; the separators and the two extensions of anyone of the tracks do not support a load and have the simple shape of cones which makes them easy to manufacture in series using any solid material such as, but not limited to, aluminum, plastics, polyamide, ceramic, and fiberglass. The material selected for the separators of the present disclosure is not required to have a high resistance.

The foregoing and other objects and features of the present disclosure are achieved by an anti-friction bearing comprising a pair of rotatable tracks, a pair of extension members removable securely mounted to one of the pair of tracks, a plurality of spaced load-carrying rolling members rotatable engageable between the tracks, and a plurality of spacers disposed in contact with the pair of extension members, each of the plurality of spacers being engageable with and cooperatively separating an adjacent pair of the plurality of rolling elements without relative sliding motion therebetween.

In embodiments of the present disclosure, the rolling members comprise one of balls, rollers and barrels.

In another embodiment, each of the extension members is conical ring-shaped.

In yet another embodiment, the extension members are removable securely mounted to one of the pair of tracks by friction fit.

In still another embodiment, each of the plurality of spacers is in the shape of a double truncated cone.

DESCRIPTION OF THE DRAWINGS

The following description of the embodiments of the disclosure will be better understood when read in conjunction with the accompanying drawing. For the purpose of illustrating the disclosure, there is shown in the drawings embodiments which are presently preferred. It should be understood however, that the disclosure is not limited to the precise arrangement and instrumentalities shown.

For all the graphics in this presentation: B=balls, C=cage, ETI=extension of inner track 1, EIT2=extension of inner track 2, EOT1=extension of outer track 1, EOT2=extension of outer track 2, IT=internal track, K=kegs or barrels, OT=outer track, R=rollers, $\alpha$=contact angle, $\alpha_p$=cone angle of the extension tracks which make contact with the separators, $\alpha_q$=cone angle of separator which makes contact with the extensions of the tracks, and $\alpha_s$=cone angle of separator which makes contact with the rolling elements.

FIGS. 1(a) and 1(b) are perspective views showing an angular contact ball bearing (FIG. 1(a)) and an angular contact roller bearing (FIG. 1(b)) in the conventional art.

FIGS. 2(a)-2(b) show a partial sectional view and an axial view thereof of a purely radial hall bearing according to the Larsson patent.

The embodiments in FIGS. 5(a)-5(c), 6(a)-6(c), 7(a)-7(c), 8(a)-8(c), 9(a)-9(c), 10(a)-10(c), and 11(a)-11(c) illustrate the following components of the angular contact bearings:

The inner track IT, the outer track OT, the rolling elements, balls B or rollers R or kegs or barrels K, placed equidistantly separated between the two tracks IT and OT; the anti-friction separators S placed between the pair of rolling elements that they separate and the two extensions of the track EIT1 and EIT2 or EOT1 and EOT2.

Figure 10:
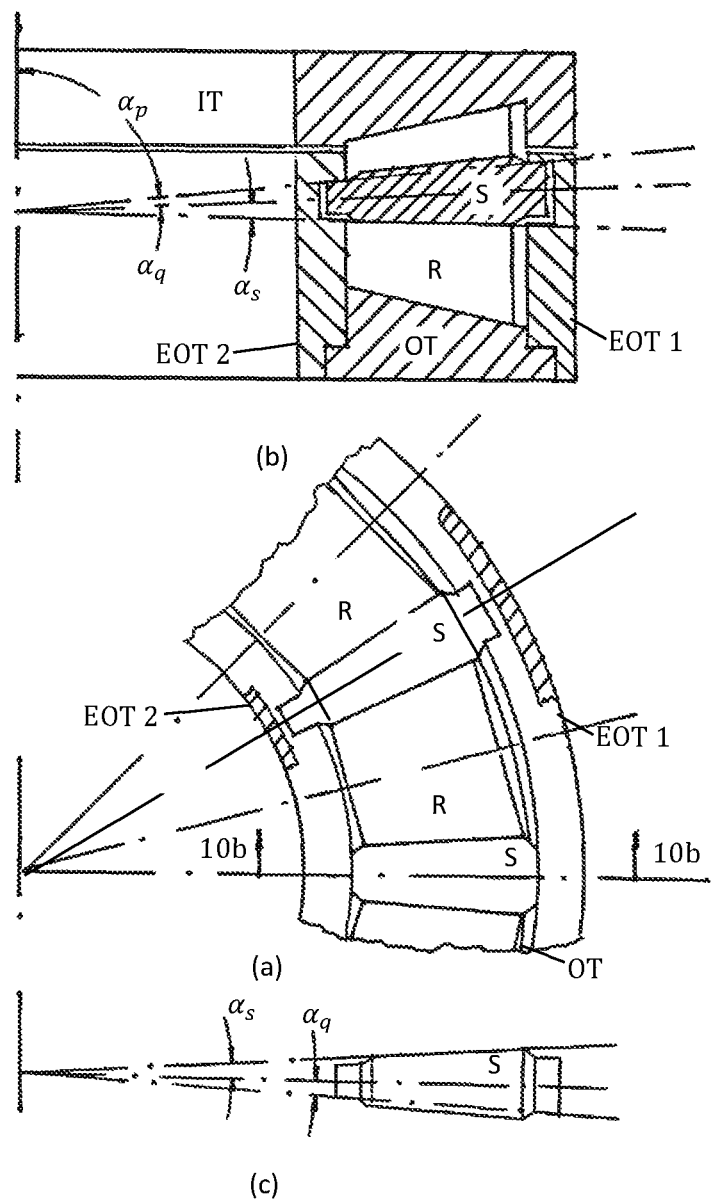
Figure 11:
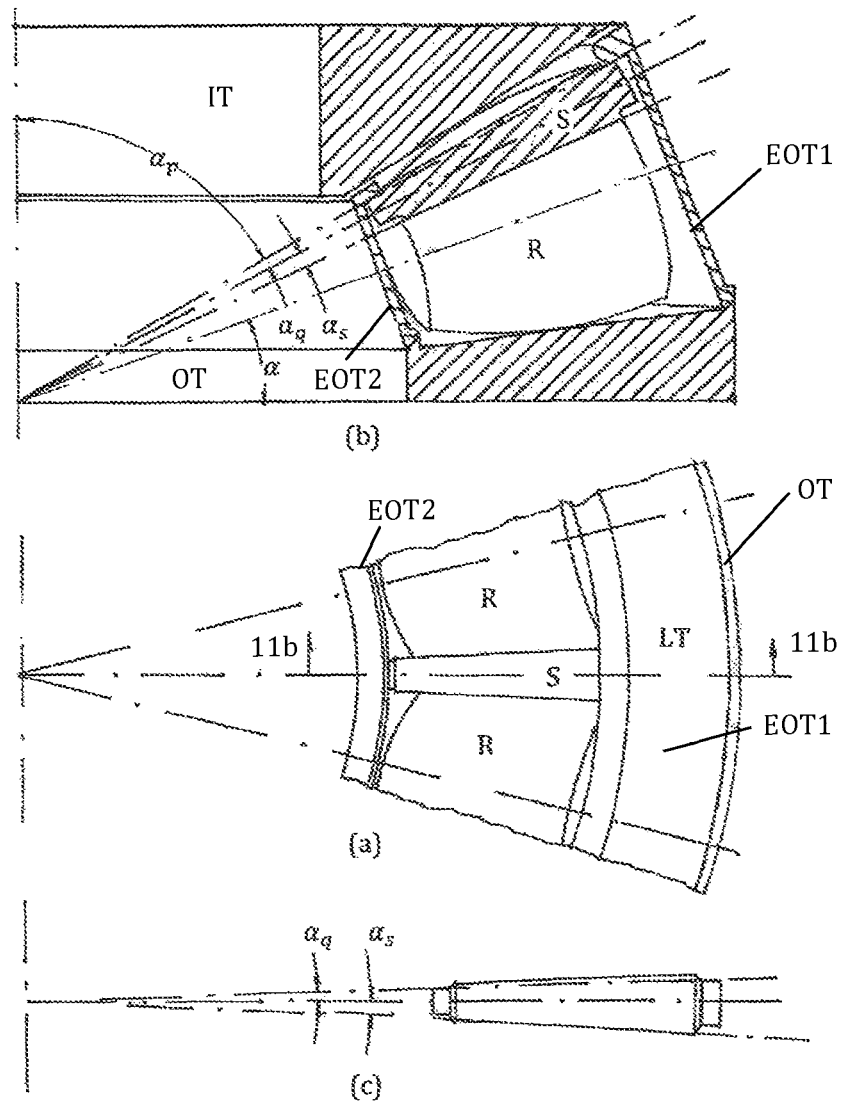
FIGS. 11(a)-11(c) show a case when the rolling elements are kegs or barrels where the separators according to this disclosure can also be used.

FIGS. 5(a), 6(a), 7(a), 8(a), 9(a), 10(a) and 11(a) are fragmentary axial views with the track without extensions removed. FIGS. 5(b)-11(b) show the two tracks, and OT, in position, where: FIG. 5(b) is a cross-sectional view taken along line 5(b)-5(b) in FIG. 5(a); FIG. 6(b) is a cross-sectional view taken along line 6(b)6(b) in FIG. 6(a); FIG. 7(b) is a cross-sectional view taken along line 7(b)-7(h) in FIG. 7(a); FIG. 8(b) is a cross-sectional view taken along line 8(b)-8(b) in FIG. 8(a); FIG. 9(b) is a cross-sectional view taken along line 9(b)-9(b) in FIG. 9(a); FIG. 10(b) is a cross-sectional view taken along line 10(b)-10(b) in FIG. 10(a) and FIG. 11(b) is a cross-sectional view taken along line 11(b)-11(h) in FIG. 10(a). FIGS. 5(c), 6(c), 7(c), 8(c), 9(c), 10(c) and 11(c) show the corresponding separators of each embodiment.

DETAILED DESCRIPTION OF THE EMBODIMENTS

Introduction

For convenience of description, the terms "inner", "outer", "top" "bottom", "front", "rear", "right", "left", "side" and words of similar import will have reference to the various members and components of the bearings of the present disclosure as arranged and illustrated in the figures of the drawings and described hereinafter in detail.

It should also be understood that the terms "about," "approximately," "generally," "substantially" and like terms, used herein when referring to a dimension or characteristic of a component of the present disclosure, indicate that the described dimension/characteristic is not a strict boundary or parameter and does not exclude minor variations therefrom that are functionally the same or similar, as would be understood by one having ordinary skill in the art.

The present disclosure relates to angular contact bearings with anti-friction separators such that all bearing parts move with pure rolling contact, i.e., without sliding contact among the bearing components.

Figure 3:
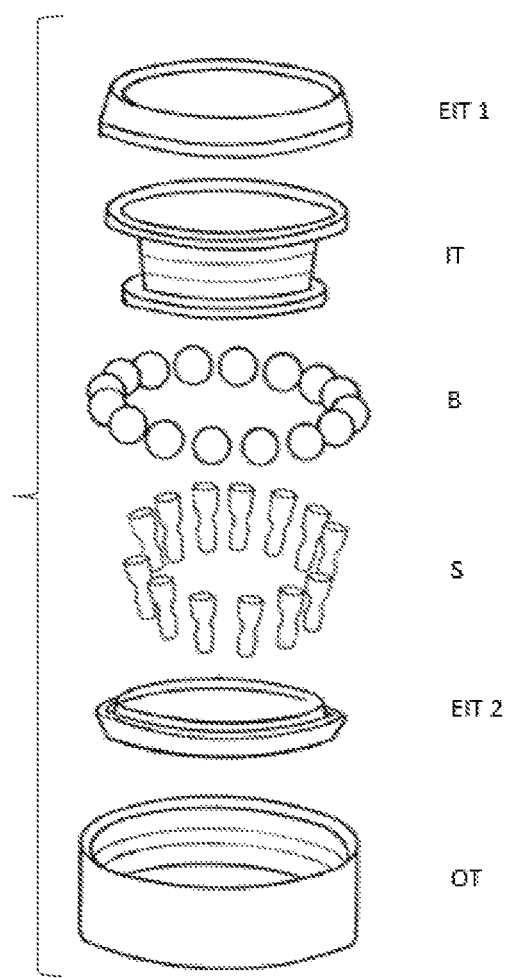
FIG. 3 is an exploded view of an angular contact ball bearing equipped with anti-friction separators according to an embodiment of the present disclosure.
Figure 4:
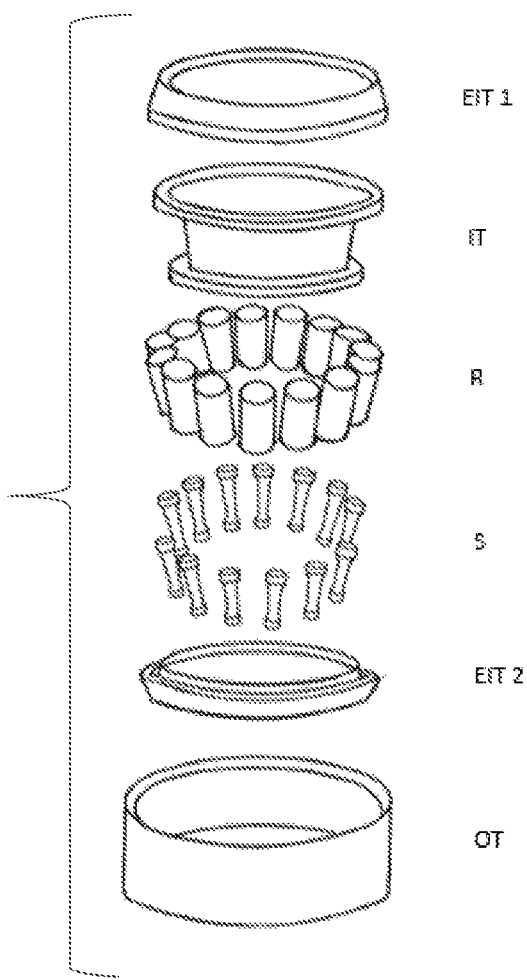
FIG. 4 is an exploded view of an angular contact roller bearing equipped with the anti-fiction separators according to another embodiment of the present disclosure.
Figure 5:
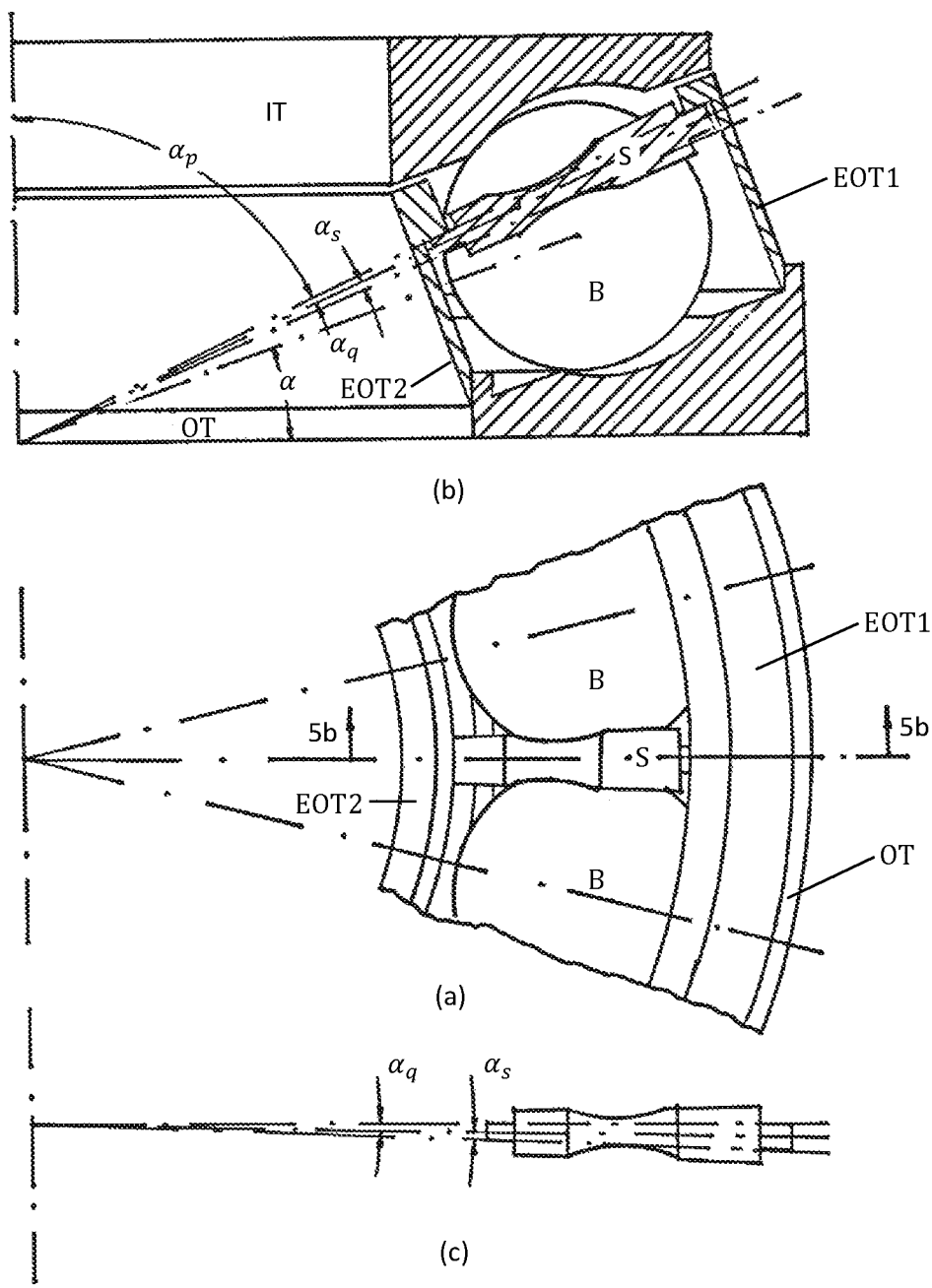
FIGS. 5(a)-5(c), 6(a)-6(c), 7(a)-7(c), 8(a)-8(c), 9(a)-9(c) and 10(a)-10(c) show embodiments of angular contact bearings according to the present disclosure for different types of rolling elements, balls B, or rollers R in cases when the separators contact the extensions of the inner track IT or the outer track OT.
Figure 6:
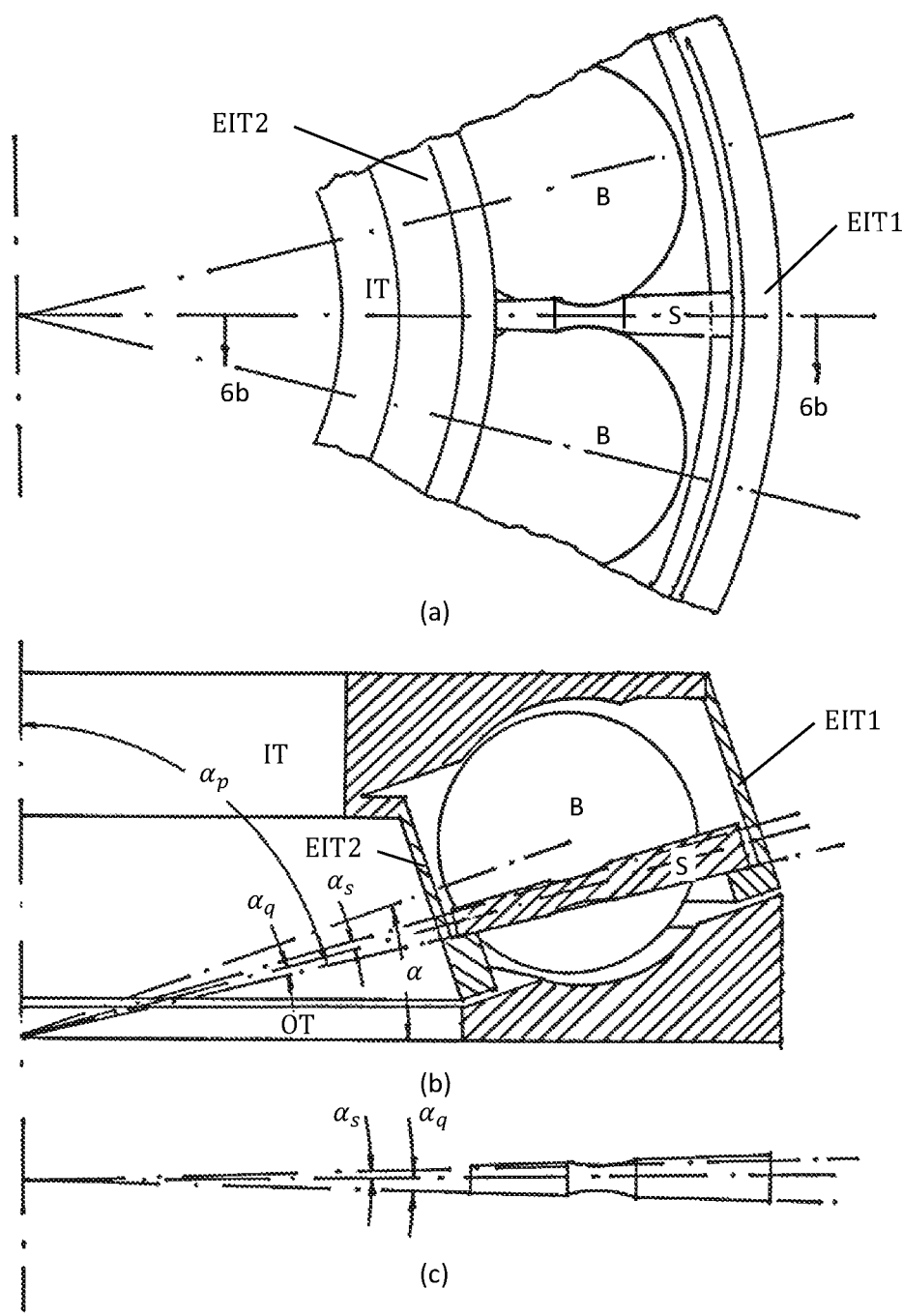
Figure 7:
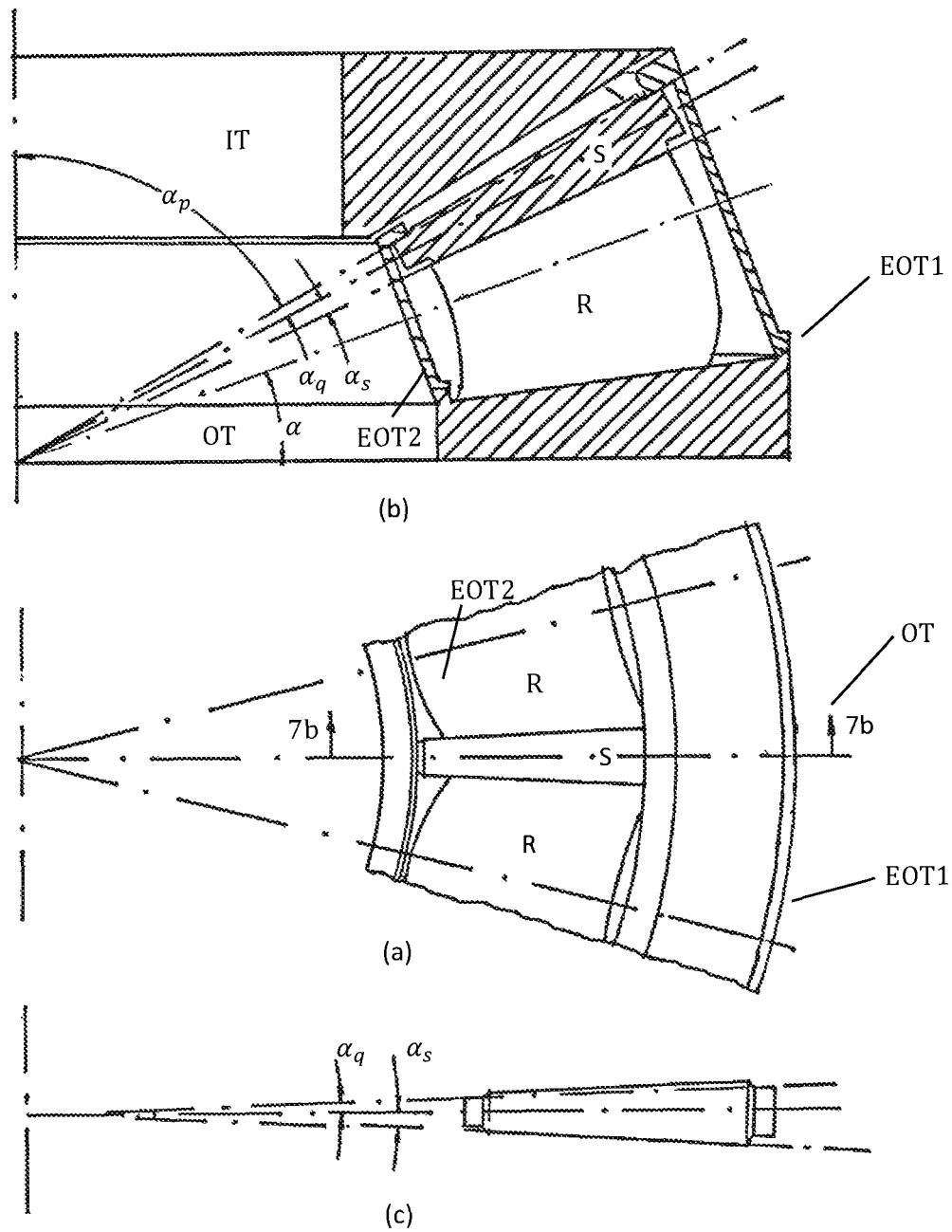
Figure 8:
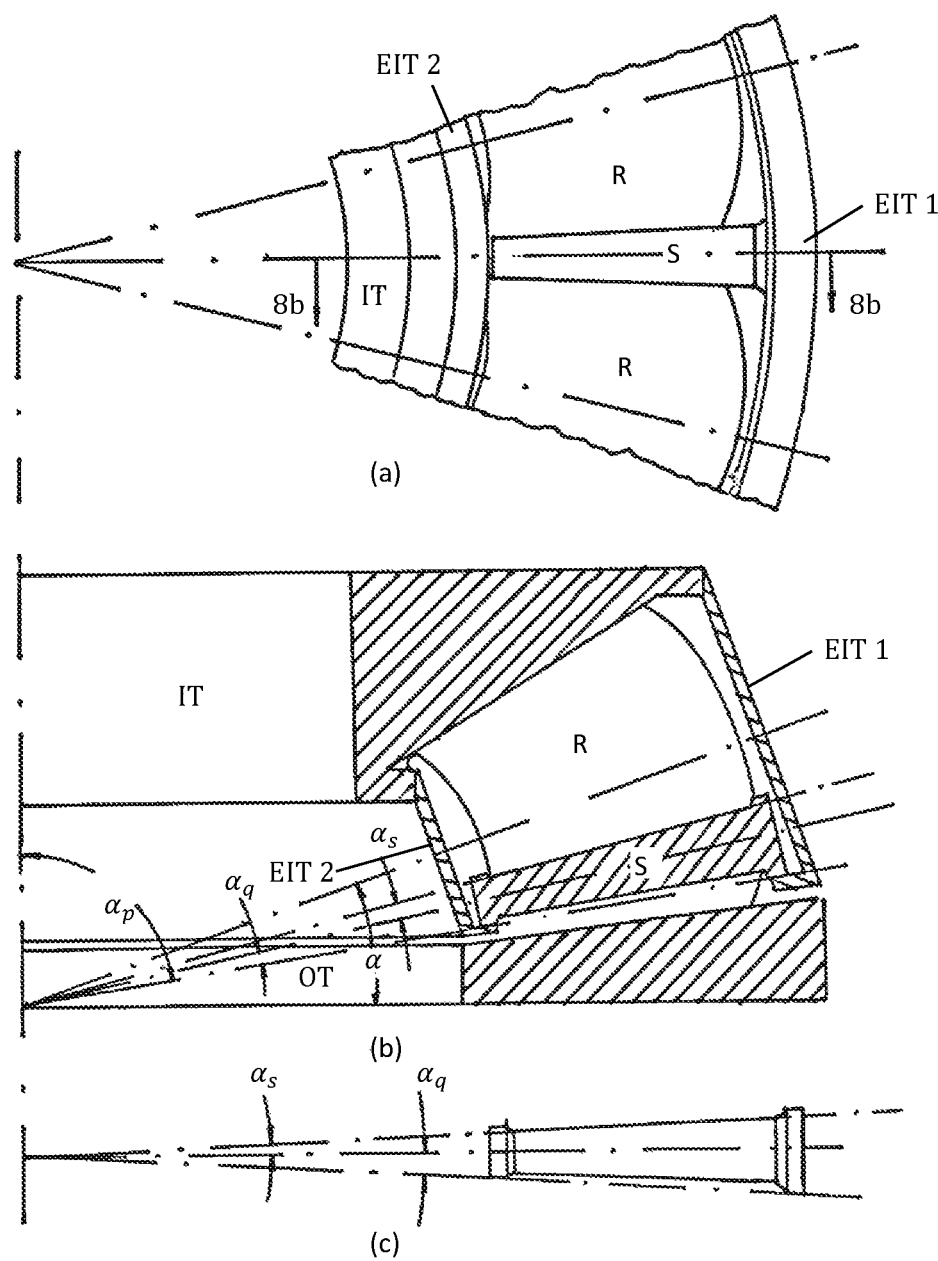
Figure 9:
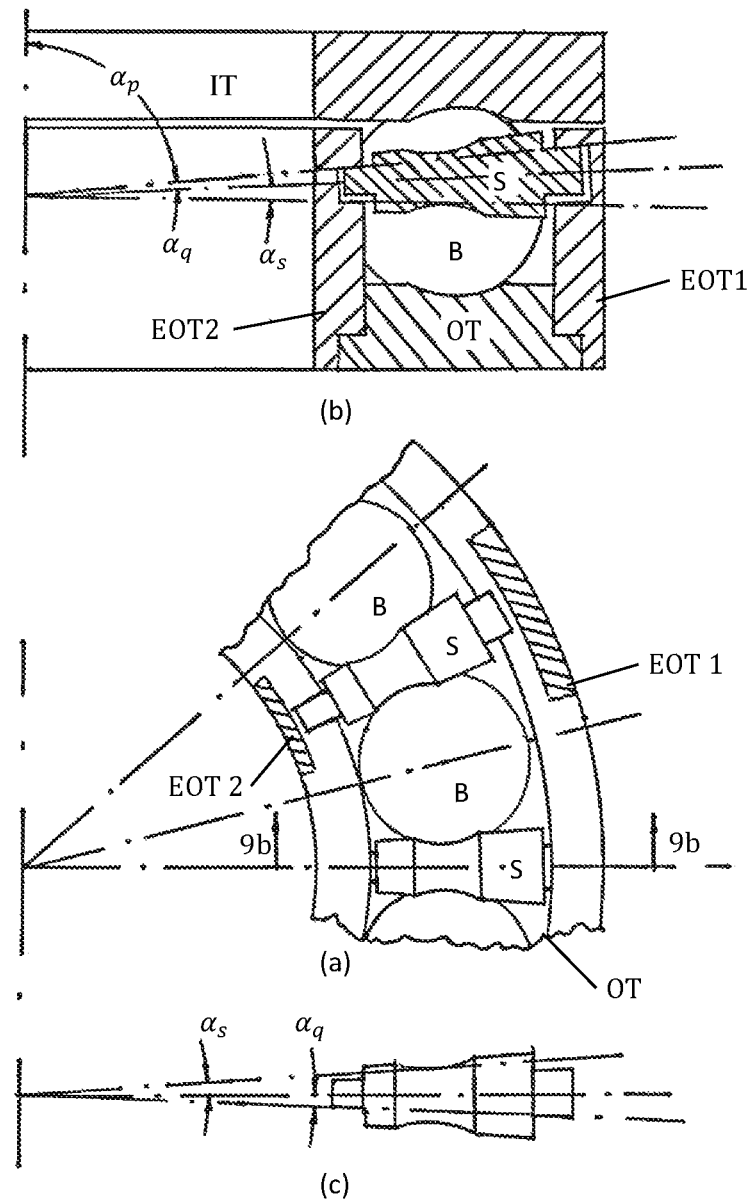

FIGS. 3 and 4 are exploded views illustrating the general components of angular contact of ball (FIG. 3) and roller (FIG. 4) bearings. Each of bearings in FIG. 3 and FIG. 4 includes an inner track IT, an outer track OT, first and second extension elements EIT1 and EIT2 of the inner track IT, rolling elements B (balls) for bearing in FIG. 3 and rolling elements R (rollers) for bearing in FIG. 4, and anti-friction separators or spacers S. The rolling elements are configured to be equidistantly placed between the inner track IT and outer track OT. Individual spacers S are configured to be placed between (i.e., to separate) the rolling elements, i.e., each spacer S is placed between two adjacent rolling, elements that it separates, and in contact with extension elements EIT1 and EIT2. Spacers S are therefore also placed equidistantly on surfaces of extensions EIT1 and EIT2. Stated otherwise, the rolling elements are arranged in alternation with an equal whole number of spacers S.

Thus, in the embodiments of the angular contact bearings according to the present disclosure, outer track OT or inner track IT, along with corresponding extension elements EOT1 and EOT2 or EIT1 and EIT2, are arranged for pure rolling contact with respect to each other through an intervening series of spaced rolling elements. The rolling, elements are anti-frictionally spaced from each other by intervening spacers S, which are, without sliding, in contact with first and second extension elements EIT1 and EIT2 or EOT1 and EOT2 of one of inner track IT or outer track OT and are carried by the rolling elements in pure rolling, contact therewith. Stated otherwise, the rolling elements which provide relative motion of outer track OT and inner track IT, are substantially uniformly and circumferentially spaced by locating between each of pair of adjacent rolling elements a spacer with pure rolling contact engagement with and supported by the rolling elements and the two extensions of one track. By this arrangement, friction usually produced by cages associated with conventional angular contact bearings, as described above; is eliminated.

In the angular contact bearings according to the embodiments of the present disclosure, spacers S and extension elements EIT1 and EIT2 or EOT1 and EOT2 of one of inner track IT and outer track OT according to the present disclosure replace the conventional cage and, therefore, eliminate the sliding contact associated with components of conventional angular contact bearings, as described above. When spacers S are placed between the rolling elements (e.g., balls or rollers) and in contact with extension elements EIT1 and EIT2 or EOT1 and EOT2 of the angular contact bearings according to the present disclosure, they guarantee pure rolling contact among all the components of the bearings. To achieve this, spacers S are positioned with pure rolling contact between the corresponding rolling elements along with extensions EIT1 and EIT2 or EOT1 and EOT2 being releasably secured to one of inner track IT and outer track OT.

In order to achieve the objects of the present disclosure, the condition of pure rolling contact is imposed among all the components of the hearings according to embodiments of the present disclosure. As such, each spacer S according to the present disclosure is configured in the form of two truncated cones with common vertices and axes of symmetry. For each spacer S, one of these truncated cones contacts, in its central surface, the two rolling elements that it separates, and the other truncated cone contacts first and second extension elements EIT1 and EIT2 or EOT1 and EOT2 at their ends. First and second extensions EIT1 and EIT2 or EOT1 and EOT2 make up another cone whose axis of symmetry coincides with the axis of rotation of the hearing, and its vertex matches with the vertex of the cones of the spacers. The vertex angle of the last-mentioned cone is also determined by the pure rolling condition imposed to the kinetics of the bearings.

Moreover, all of the cones lengths (heights) of spacers S and extensions EIT1 and EIT2 or EOT1 and EOT2 are only limited by the availability of space for its location. It is also important to note that all the angles of the vertexes of the three above mentioned cones are functions (non-shown) of the magnitudes of the other components of the bearing, including the radius of the tracks, the dimensions of the rolling elements, the number of the rolling elements and the contact angle $\alpha$. The lengths of the cones are determined as function of the angles of its vertexes and the available space for its location in the bearing.

It will be appreciated that for bearings of the contact angular type according to the present disclosure, the rolling elements and the individual spacers have a motion in space known as a "rolling cone" where they rotate around a fixed point. Because of this, the spacers according to the present disclosure have to have the form of two truncated cones with common vertices and axes of symmetry as described above.

It will also be appreciated that the synthesis for such contact angular type bearings is much more complex than those for radial bearings. This means that the cylindrical spacers for purely radial bearings, such as disclosed by Larsson as described above, cannot be used for angular contact bearings and vice versa because the kind of motion that they perform are very different.

Presentation of the Designs

Various designs of the present disclosure will be described more fully hereinafter with reference to the accompanying drawings, in which exemplary embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art.

FIGS. 5(a)-5(c), 6(a)-6(c), 7(a)-7(c), 8(a)-8(c), 9(a)-9(c), 10(a)-10(c) and 11(a)-11(c) show angular contact bearings equipped with spacers according to various embodiments of the present disclosure. There are two possible locations for the spacers for each type of rolling elements. This depends on the extensions of the track that they contact; the inner track, or the outer track. The designs are shown with the axis of symmetry of the bearings in a vertical position.

To be able to observe the rolling elements and its separators, in the figures designated with (a), i.e. 5(a), 6(a), etc., the track that does not make contact with the separators is removed. The figures designated with (c) are side views of the spacers corresponding to each case showing the vertex angles of the separators cones.

FIGS. 5(a)-5(c) show an embodiment of an angular contact ball bearing according to the present disclosure in which spacers S are in contact with the extensions of the outer track EOT1 and EOT2. FIG. 5(a) is a fragmentary axial view and FIG. 5(b) is a cross-sectional view along the line A-A in FIG. 5(a).

FIGS. 6(a)-6(c) show an embodiment of an angular contact ball bearing according to the present disclosure in which spacers S are in contact with the extension of the inner track EIT1 and EIT2. FIG. 6(a) is a fragmentary axial view and FIG. 6(b) is a cross-sectional view along the line A-A in FIG. 6(a).

FIGS. 7(a)-7(c) show an embodiment of an angular contact roller bearing according to the present disclosure in which spacers S are in contact with the extensions of the outer track EOT1 and EOT2. FIG. 7(a) is a fragmentary axial view and FIG. 7(b) is a cross-sectional view along the line A-A in FIG. 7(a)

FIGS. 8(a)-8(c) show an embodiment of an angular contact roller bearing according to the present disclosure in which spacers S are in contact with the extensions of the inner track, EIT1 and EIT2. FIG. 8(a) is a fragmentary axial view and FIG. 8(b) is a cross-sectional view along the line A-A in FIG. 8(a).

FIGS. 9(a)-9(c) show a purely axial ball bearing, corresponding to the special case when contact angle $\alpha$ is equal to zero, equipped with a spacer S arrangement according to the present disclosure. FIG. 9(a) is a fragmentary axial view and FIG. 9(b) is a cross-sectional view along the line A-A in FIG. 9(a).

FIGS. 10(a)-10(c) show a purely axial roller bearing, corresponding to the special case when contact angle $\alpha$ is equal to zero, equipped with a spacer S arrangement according to the present disclosure. FIG. 10(a) is a fragmentary axial view and FIG. 10(b) is a cross-sectional view along the line A-A in FIG. 10(a).

In the embodiments of the purely axial bearings shown in FIGS. 9(a)-9(c) and 10(a)-10(c), due to the symmetry of the bearing along the horizontal axis, spacers S that contact extensions of the inner track, EIT1 and EIT2 are identical to those that contact the extensions of the outer track, EOT1 and EOT2. Therefore, unlike for the angular contact bearings of the present disclosure described above, for purely axial bearings the configuration of spacers S and the track does net depend en which of the two tracks they, contact.

FIGS. 11(a)-11(c) show another embodiment of a hearing according to the present disclosure employing barrel or keg-shaped rolling elements. FIG. 11(a) is a fragmentary axial view and FIG. 11(b) is a cross-sectional view along the line A-A in FIG. 11(a). This embodiment illustrates the versatility of the bearings according to the present disclosure, in Which various rolling element configurations may be employed.

Figure 12:
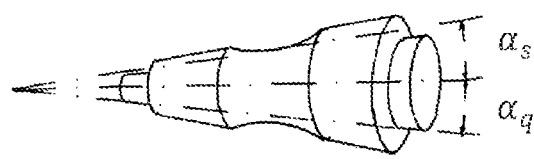
FIGS. 12(a)-12(d) are perspective views of the different forms of the separators according to the various embodiments of the present disclosure.
Figure 12:
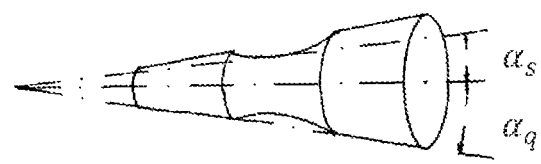
Figure 12:
Figure 12:

FIGS. 12(a)-12(d) are perspective views showing embodiments of separators/spacers S according to the present disclosure, including corresponding angles $\alpha_s$ and $\alpha_q$ for each spacer. In these figures. FIG. 12(a) shows separator S used in the angular contact ball bearing of FIGS. 5(a)-5(c) and the purely axial ball bearing of FIGS. 9(a)-9(c), 12(b) shows separator S used in the angular contact ball bearing of FIGS. 6(a)-6(c); FIG. 12(c) shows separator S used in the angular contact roller bearing of FIGS. 7(a)-7(c) and the purely axial roller bearing of FIGS. 10(a)-10(c), this type of separator can also be used for the designs shown in the FIGS. 5(a)-5(c), 9(a)-9(c), and 11(a)-11(c). Finally, FIG. 12(d) shows separator S used in the angular contact roller beating of FIGS. 8(a)-8(c).

As shown in FIGS. 12(a)-12(b), each a the spacers for the ball bearing is provided with a circumferential groove so that the balls prevent the displacement of the spacers in their axis of symmetry direction. This is a modification from the original double truncated cone shape of the spacers. When the bearings incorporate rollers, this effect occurs due to the designs a the ends of the spacers.

Therefore, in the case of ball bearings, balls prevent the displacement of spacers in the direction of its axis of symmetry through the slots on the spacers. In the case of roller bearings, when the contact is made with outer track OT, the extension elements of the tracks hinder this movement. On the other hand, when the contact is made with inner track IT, the rollers prevent such displacement as is shown in the figures.

It is interesting to observe that according to a feature of the angular contact bearings in the embodiments of the present disclosure, for spacers in contact with outer track OT angle $\alpha_s$ is always greater than angle $\alpha_q$. In contrast, for spacers in contact with inner track IT angle $\alpha_q$ is always greater than angle $\alpha_s$.

Given that all the extensions of the tracks of the embodiment shown in FIGS. 5(a)-5(c), 6(a)-6(c), 7(a)-7(c), 8(a)-8(c), 9(a)-9(c), 10(a)-10(c), and 11(a)-11(c) are very similar, it is enough to take one of them to describe the characteristics of all of them. For this reason, it has been chosen the one in FIGS. 8(a)-8(c).

Figure 13:
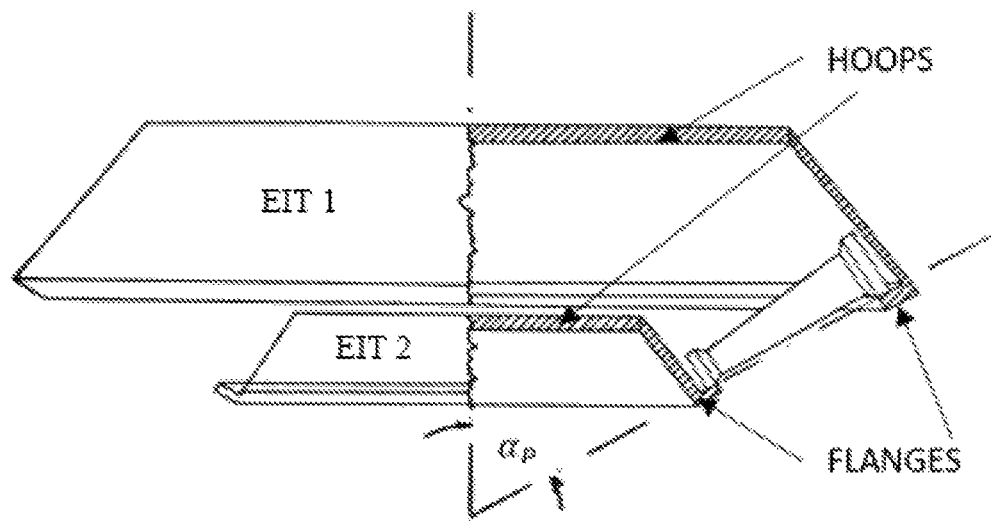
FIG. 13 shows, as an example, a radial view in partial cross-section of the two extensions of the inner track, EIT1 and EIT2, with one separator in its position when they are isolated from the bearing. For this case, the embodiment of FIG. 8 has been selected but with an increased contact angle $\alpha$.

FIG. 13 is a radial view in partial cross-section of the two extensions of the inner track in FIGS. 8(a)-8(c) when they are separated from the rest of the angular contact bearing components. There is only one separator in its position and the contact angle $\alpha$ is duplicate to clarify the figure.

From this figure it is possible to observe that the two extensions of the track, EIT1 and EIT2, have the general form of thin-walled, truncated cones. The upper hoops of the two truncated cones are removably mounted by sufficient friction fit, to opposing ends of the inner track. The lower ends of the two truncated cones have flanges of conical surfaces where the separators roll with pure rolling contact. These conical surfaces form the angle $\alpha_p$ with the axis of symmetry of the bearing, as it is shown.

The spacers and extension elements for the angular contact bearings according to the embodiments of the present disclosure can be easily manufactured from a series of solid materials including, but not limited to, steel, aluminum, bronze, plastics, polyamide, fiberglass, and ceramic. The materials do not need to have a high resistance. The angular contact bearings according to the embodiments of the present disclosure are suitable for fabrication in any size and number of rolling elements and corresponding spacers.

Given the form of thin-walled truncated cones as described above, the extensions of the track can be manufactured from thin sheets of metal by a die cutting or pressing process with which it is possible to obtain a large amount of track extensions in a short time and with great precision which is very important for the proper functioning of the bearings.

Assembly of the angular bearings according to the present disclosure could be as follows: first, one of the extensions tracks is securely mounted to one of the inner and outer track edge, then all the rolling elements are assembled, all the separators are placed between the corresponding pair of rolling elements and finally the other extension track is securely mounted on the other end of the track.

The configurations of the spacers in the angular contact bearings according to the embodiments of the present disclosure allow for a maximum number of possible rolling elements to be incorporated in the bearings. As a result, maximum static and dynamic load capabilities as well as optimal load distributions are obtained.

The configurations of the angular contact bearings according to the embodiments of the present disclosure suitably accommodate configurations of rolling elements other than balls or rollers, such as kegs or barrels, as well as configurations with more than one row of rolling elements.

The spacers and extension elements of the angular contact bearings according to the embodiments of the present disclosure guarantee pure rolling contact among all the bearing components when the angles of the three cones (two of the spacers and one of the track extension elements) are determined by the pure rolling contact condition imposed on the kinetics of such angular contact bearings. Thus, the angular contact bearings according to the present disclosure are configured to operate with much less friction and wear than conventional ones fitted with cages. This in turn will allow an increase in the angular speed of running and the functional fatigue limit and, therefore, the useful life of these bearings.

The spacers of the angular contact bearings according to the embodiments of the present disclosure are very well supported and exhibit little slack or play. This allows them to support great forces and vibrations that are generated at high speeds.

The spacers of the angular contact bearings according to the embodiments of the present disclosure are easy and economical to manufacture.

The extension elements of the angular contact bearings according to the embodiments of the present disclosure provide a great obturation in the bearing which contains lubricant and prevent the penetration of dirt.

In the angular contact bearings according to the embodiments of the present disclosure, the individual spacers allow for a simple lubrication systems to be provided. This is because friction due to sliding, among the components of the angular contact bearings according to the embodiments of the present disclosure is substantially reduced, if not eliminated.

According to another feature of the angular contact bearings according to the embodiments of the present disclosure, all of the dimensions of components which are in common with related bearings with cages remain intact when the individual spacers and extension elements are incorporated. Therefore, the angular contact bearings according to the embodiments of the present disclosure comply with ISO standards (International Organization for Standardization) and DIM.

In view of the foregoing, it will be appreciated that the angular contact bearings of the present disclosure are formed with bearing components which move with pure rolling contact, i.e., without sliding contact among the bearing integral parts. The components include individual anti-friction separators which substantially improve the performance of the angular contact bearings and reduce the chances of failure. The individual anti-friction separators effectively eliminate friction and wear caused by conventional cages, obtain greater wear and fatigue functioning times, increase the operating speed ranges, boost the time and speed of operation, and increase capacities of static and dynamic load by occupying less space which makes it possible to arrange a larger number of rolling elements in the angular contact bearings and, therefore, raise the load capacities of the bearings. The angular con tact bearings with anti-friction separators according to the present disclosure are also economical and easy to manufacture and assemble.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but are to be accorded the widest scope consistent with the principles and novel features disclosed herein.

The invention claimed is:

1. An anti-friction angular contact and purely axial bearing comprising:
   a pair of rotatable tracks;
   a pair of extension members removably securely mounted to one of the pair of tracks, each extension member being configured as a ring-shaped truncated cone;
   a plurality of equidistantly spaced, load-carrying rolling members rotatably engageable with the tracks; and
   a plurality of individual spacers disposed in pure rolling contact with the pair of extension members, each of the plurality of individual spacers being positioned in pure rolling contact between a corresponding adjacent pair of the rolling elements;
   wherein each of the spacers is configured in the form of two truncated cones with common vertices and axis of symmetry, one of the cones contacting with pure rolling contact, in its central surface, the two rolling elements that it separates, and the other cone contacting with pure rolling contact the two extension members at their ends.

2. The anti-friction angular contact and purely axial bearing according to claim 1, wherein the rolling members comprise balls.

3. The anti-friction angular contact and purely axial bearing according to 2, wherein each of the spacers has a circumferential groove on its central surface so that the balls prevent displacement of the spacers in their axis of symmetry direction.

4. The anti-friction angular contact and purely axial bearing according to claim 1, wherein the rolling members comprise rollers.

5. The anti-friction angular contact and purely axial bearing according to claim 1, wherein the rolling members are barrel-shaped or kegs.

6. The anti-friction angular contact and purely axial bearing according to claim 1, wherein the rolling members are arranged in multiple rows of rolling members.

7. The anti-friction angular contact and purely axial bearing according to claim 1, wherein the ring-shaped truncated cone of each extension member has the shape of a thin-walled truncated cone, an internal truncated conical surface of each of the extension members and the truncated cones of the spacers having common vertices, and the two internal truncated conical surfaces of the extension members and the bearing having a common axis of symmetry.

8. The anti-friction angular contact and pure axial bearing according to claim 1, wherein the two extension members are removably securely mounted to one of the pair of tracks by friction fit.

9. The anti-friction angular contact and pure axial bearing according to claim 1, wherein the tracks, extension members, rolling members and spacers are arranged for undergoing pure rolling contact with respect to each other such that there is no sliding contact between the tracks, extension members, rolling members and spacers to avoid friction, wear and heat generation in the bearing.

10. The anti-friction angular contact and pure axial bearing according to the claim 1, wherein each of the spacers cannot move in the direction of their axes of symmetry because the rolling elements or the two extensions of one of the tracks prevent them from.

11. The anti-friction angular contact and purely axial bearing according to claim 1, wherein a truncated internal conical surface of each of the two extensions members has an inclination angle $\alpha_p$ and has a vertex in common with a vertex of the cones forming the spacers, the axis of symmetry of each extension member coinciding with the axis of symmetry of the bearing; wherein the two truncated cones forming each spacer have the same vertices and axes of symmetry, the one truncated cone that is in pure rolling contact in its central surface with the two rolling elements that it separates has an inclination angle $\alpha_s$, and the other truncated cone that is in pure rolling contact at its ends with the two extension members of one of the tracks has an inclination angle $\alpha_q$; and wherein the three angles $\alpha_p$, $\alpha_s$ and $\alpha_q$ are interdependent with one another such that the determination of any of the three angles determines the other two of the three angles.

12. The anti-friction angular contact and purely axial bearing according to claim 1, wherein a truncated internal conical surface of each of the two extensions members has an inclination angle $\alpha_p$ and has a vertex in common with a vertex of the cones forming the spacers, the axis of symmetry of each extension member coinciding with the axis of symmetry of the bearing; wherein the two truncated cones forming each spacer have the same vertices and axes of symmetry, the one truncated cone that is in pure rolling contact in its central surface with the two rolling elements that it separates has an inclination angle $\alpha_s$, and the other truncated cone that is in pure rolling contact at its ends with the two extension members of one of the tracks has an inclination angle $\alpha_q$; and wherein the three angles $\alpha_p$, $\alpha_s$ and $\alpha_q$ are defined by the dimensions and number of rolling elements, the diameters of the tracks and the contact angle $\alpha$ of the angular contact and purely axial bearing.

13. The anti-friction angular contact and purely axial bearing according to claim 1, wherein a truncated internal conical surface of each of the two extensions members has an inclination angle $\alpha_p$ and has a vertex in common with a vertex of the cones forming the spacers, the axis of symmetry of each extension member coinciding with the axis of symmetry of the bearing; wherein the two truncated cones forming each spacer have the same vertices and axes of symmetry, the one truncated cone that is in pure rolling contact in its central surface with the two rolling elements that it separates has an inclination angle $\alpha_s$, and the other truncated cone that is in pure rolling contact at its ends with the two extension members of one of the tracks has an inclination angle $\alpha_q$; wherein the pair of rotatable tracks comprises an inner track and an outer track; and wherein when the ends of the spacers contact without sliding the two internal conical surfaces of the two extensions of the inner track, the inclination angle $\alpha_q$ is greater than the inclination angle $\alpha_s$, and when the two ends of the spacers contact with pure rolling contact the internal conical surfaces of the two extension members of the outer track, the angle of inclination $\alpha_q$ is less than the angle of inclination $\alpha_s$.

14. An angular contact bearing comprising:
   an inner track;
   an outer track;
   two extension members extending from one of the inner and outer tracks;
   a plurality of spaced, load-carrying rolling members rotatably engageable with the inner and outer tracks; and
   a plurality of individual spacers disposed in pure rolling contact with the rolling members and the two extension members;
   wherein each of the spacers is configured in the form of two truncated cones with common vertices and axis of symmetry, one of the cones contacting, in its central surface, the two rolling elements that it separates, and the other cone contacting the two extension members at their ends.

15. The angular contact bearing according to claim 14, wherein each of the spacers is placed between and separates an adjacent pair of the rolling elements and is in contact with the two extension members at their ends.

16. The angular contact bearing according to claim 14, wherein the rolling members comprise one of balls, rollers and barrel-shaped members.

17. The angular contact bearing according to claim 14, wherein the two extension members are removably securely mounted to the one of the inner and outer tracks.

18. The angular contact bearing according to claim 14, wherein a truncated internal conical surface of each of the two extensions members has an inclination angle $\alpha_p$ and has a vertex in common with a vertex of the cones forming the spacers, the axis of symmetry of each extension member coinciding with the axis of symmetry of the bearing; wherein the two truncated cones forming each spacer have the same vertices and axes of symmetry, the one truncated cone that is in pure rolling contact in its central surface with the two rolling elements that it separates has an inclination angle $\alpha_s$, and the other truncated cone that is in pure rolling contact at its ends with the two extension members of one of the tracks has an inclination angle $\alpha_q$; and wherein the three angles $\alpha_p$, $\alpha_s$ and $\alpha_q$ are interdependent with one another such that the determination of any of the three angles determines the other two of the three angles.

19. The angular contact bearing according to claim 14, wherein a truncated internal conical surface of each of the two extensions members has an inclination angle $\alpha_p$ and has a vertex in common with a vertex of the cones forming the spacers, the axis of symmetry of each extension member coinciding with the axis of symmetry of the bearing; wherein the two truncated cones forming each spacer have the same vertices and axes of symmetry, the one truncated cone that is in pure rolling contact in its central surface with the two rolling elements that it separates has an inclination angle $\alpha_s$, and the other truncated cone that is in pure rolling contact at its ends with the two extension members of one of the tracks has an inclination angle $\alpha_q$; and wherein the three angles $\alpha_p$, $\alpha_s$ and $\alpha_q$ are defined by the dimensions and number of rolling elements, the diameters of the tracks and the contact angle $\alpha$ of the angular contact and purely axial bearing.

20. The angular contact bearing according to claim 14, wherein a truncated internal conical surface of each of the two extensions members has an inclination angle $\alpha_p$ and has a vertex in common with a vertex of the cones forming the spacers, the axis of symmetry of each extension member coinciding with the axis of symmetry of the bearing; wherein the two truncated cones forming each spacer have the same vertices and axes of symmetry, the one truncated cone that is in pure rolling contact in its central surface with the two rolling elements that it separates has an inclination angle $\alpha_s$, and the other truncated cone that is in pure rolling contact at its ends with the two extension members of one of the tracks has an inclination angle $\alpha_q$; and wherein when the ends of the spacers contact without sliding the two internal conical surfaces of the two extensions of the inner track, the inclination angle $\alpha_q$ is greater than the inclination angle $\alpha_s$ and when the two ends of the spacers contact with pure rolling contact the internal conical surfaces of the two extension members of the outer track, the angle of inclination $\alpha_q$ is less than the angle of inclination $\alpha_s$.

* * * * *